United States Patent [19]

Livesay

[11] Patent Number: 4,612,765
[45] Date of Patent: Sep. 23, 1986

[54] ANVIL APPARATUS FOR A PRESS
[75] Inventor: Richard E. Livesay, Peoria, Ill.
[73] Assignee: Caterpillar Inc., Peoria, Ill.
[21] Appl. No.: 749,331
[22] Filed: Jun. 27, 1985
[51] Int. Cl.[4] ............................................... B21L 9/06
[52] U.S. Cl. .......................................... 59/7; 29/252; 72/465; 403/122
[58] Field of Search ...................... 59/5, 7, 8, 12, 35.1; 29/252; 72/465, 397, 466, 462; 403/115, 122

[56] References Cited
U.S. PATENT DOCUMENTS

| | | | |
|---|---|---|---|
| 2,301,888 | 11/1942 | Lear | 72/465 |
| 3,636,747 | 1/1972 | Esterzon et al. | 72/214 |
| 3,852,991 | 12/1984 | Poggio | 72/389 |
| 4,084,422 | 4/1978 | Zilges et al. | 72/253 R |
| 4,543,818 | 10/1985 | Moriki et al. | 59/5 |

FOREIGN PATENT DOCUMENTS

| | | |
|---|---|---|
| 2419709 | 11/1975 | Fed. Rep. of Germany . |
| 6911 | 1/1981 | Japan ................................... 403/122 |
| 837541 | 6/1981 | U.S.S.R. ................................ 72/462 |

Primary Examiner—Francis S. Husar
Assistant Examiner—David B. Jones
Attorney, Agent, or Firm—Sterling R. Booth, Jr.

[57] ABSTRACT

Conventional apparatus for pressing retaining rings into a track assembly do not properly line up with the retaining ring when the press is under the high pressure required. The subject apparatus overcomes this problem by providing a self-aligning anvil for driving a tool. The anvil has an adapter for mounting it to the press and an anvil member with a work surface for engaging the tool. The adapter engages the anvil member along a semi-spherical mating surface having a radius extending from the intersection of the centerline of the anvil and a plane extending through a tool land of the tool where it engages the workpiece. The anvil member is attached to the adapter by a pin attached to the anvil member which extends across the semi-spherical mating surface into a resilient member mounted in the adapter at its center.

2 Claims, 3 Drawing Figures

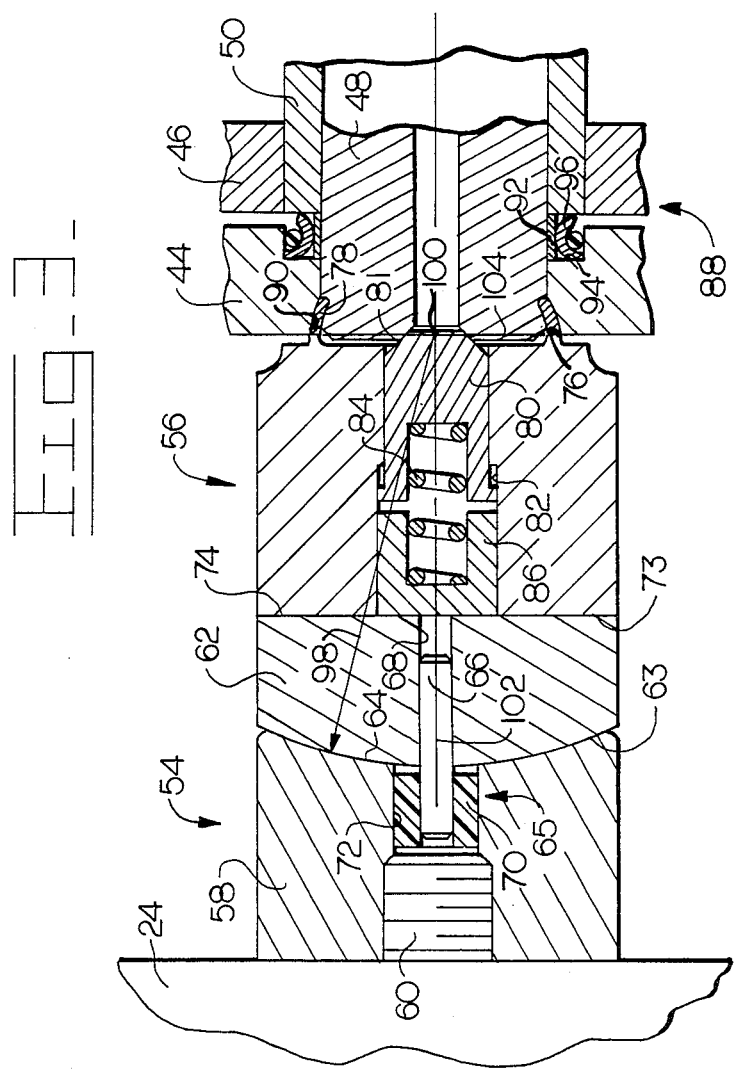

ANVIL APPARATUS FOR A PRESS

TECHNICAL FIELD

This invention relates to an anvil apparatus for a press and more particularly to a self-aligning anvil for proper orientation with a work piece.

BACKGROUND ART

Recently assignee of this application developed a track joint pin retaining method in which a retaining ring is pressed into a groove between the track pin and track link. As it is pressed into place, the ring is reformed to take the shape of the groove and thus becomes the retaining means for the link and pin.

The above process may be accomplished with a track press as described in U.S. Pat. No. 4,027,471 issued to Lipp et al, June 7, 1977 and assigned to the assignee of the present invention. As these presses wear with use, it becomes difficult to maintain their plungers in perfect alignment. Since high forces are required to reform the ring into its new shape, worn press heads tend to allow the plungers to come out of alignment with the ring. Since the ring is relatively small in cross section, the tools mounted on the plungers come out of alignment witn the ring. This pushes the ring sideways causing it to not seat properly in its groove or mashing it before it actually enters the groove. Either results in the entire process having to be repeated.

The present invention is directed to overcoming the problem set forth above.

DISCLOSURE OF THE INVENTION

In one aspect of the invention, a self-aligning anvil is adapted to cooperate with a tool. The self alignment is provided by a semi-spherical mating surface between an adapter and an anvil member of the anvil. To obtain the proper alignment of the anvil work surface, the semi-spherical surface is formed on a radius extending from an intersection of a centerline of the anvil and a plane defined by a work-engaging surface of a tool.

The self-aligning anvil allows the tool to make proper engagement with the workpiece or ring, to compensate for the slack in the press causes the plungers to move out of parallel as the force on the tool increases. In this aspect, the anvil may be separate from the tool and the tool is free to move about on a work face of the anvil member.

The foregoing and other aspects will become apparent from the following detailed description when considered in conjunction with the accompanying drawings. It is expressly understood, however, that the drawings are not intended as a definition of the invention but are for the purpose of illustration only.

BRIEF DESCRIPTION OF THE DRAWINGS

FIG. 3 is a longitudinal section of a preferred embodiment of a self-aligning anvil which is shown pressing a ring in place.

BEST MODE FOR CARRYING OUT THE INVENTION

Figure 1:
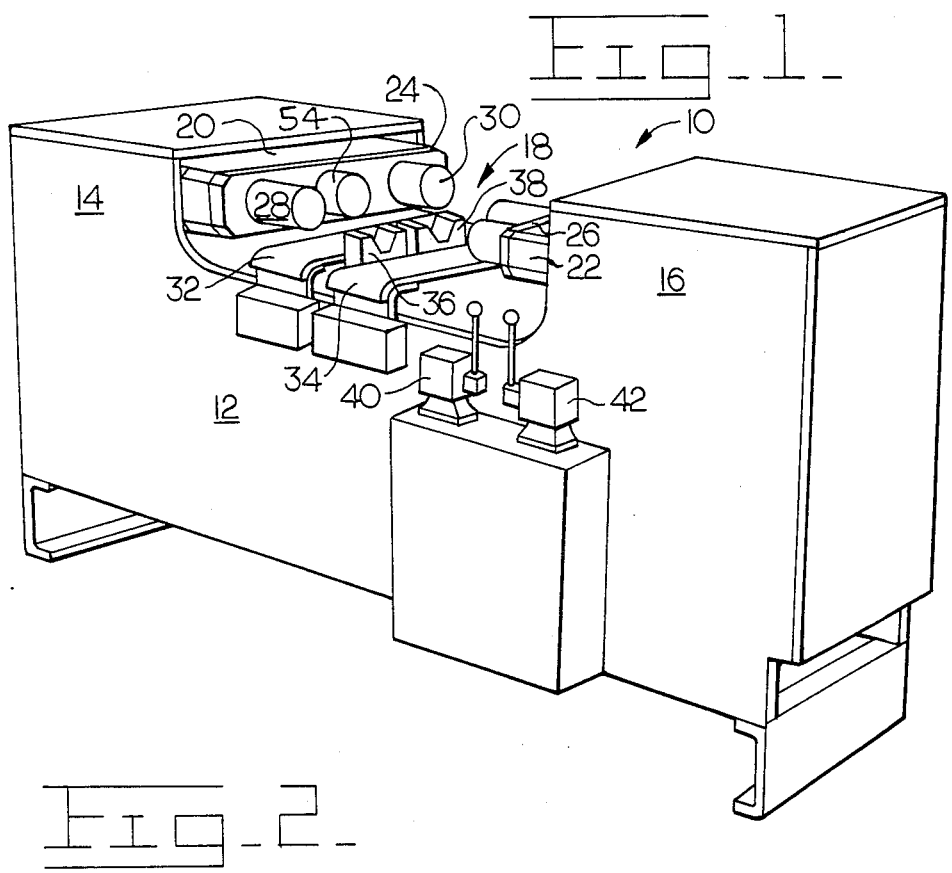
FIG. 1 is a perspective view of a multi-station track press incorporating an embodiment of the present invention.

In FIG. 1 a track press, illustrated by the numeral 10, includes a horizontally extending bed or frame 12 and a pair of vertically extending supports 14,16 which in combination, define a work station shown generally at 18. A pair of rams 20,22 extend horizontally inwardly from the vertical supports 14,16 and include multi-headed press fixtures 24,26 releasably mounted thereto. First and second pressure heads 28,30 extend inwardly from the press fixture, the heads being laterally spaced a preselected distance in accordance with the joint spacing of the track chain being assembled. Apparatus is provided for supporting and positioning the unassembled links and the coacting, concentrically disposed pin and bushing subassemblies, in a predetermined relationship with one another adjacent the multi-headed press fixtures. Such apparatus is secured to the bed of the work station and may include, by way of example, elongated plates 32,34 and V-blocks 36,38. Suitable controls 40,42 are also provided for advancing and retracting the rams and for indexing the chain during the assembly process as is well known in the art.

Figure 2:
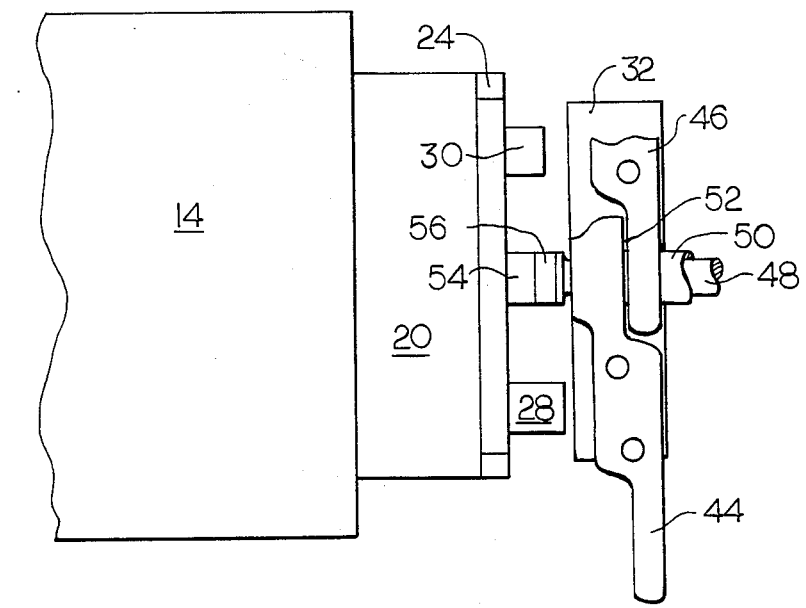
FIG. 2 is an enlarged top plan view of a portion of the press shown in FIG. 1.

Referring now to FIG. 2, the multi-headed press fixture 24 is shown with a track link 44 assembled to an adjacent link 46 by a pin 48 and bushing 50. The pin and bushing form a joint 52 which is in line with an anvil 54 and tool 56. The anvil and tool are located between the reciprocating press heads 28,30.

FIG. 3 shows the anvil 54 and tool 56 in greater detail. An adapter 58 is secured to the multi-headed press fixture 24 by a bolt 60. An anvil member 62 has a convex semi-spherical surface that engages a concave semi-spherical surface 64 of the adapter 58. The semi-spherical mating surfaces 63 and 64 have a radius 98 which extends from a point 100 at the intersection of a centerline 102 of the anvil and a plane 104 defined by the outer end of the tool, i.e. a tool land 76.

A resilient means 65 is used to attach anvil member 62 to adapter 58. A pin 66 pressed into a hole 68 of the anvil member extends along the center of the anvil and across the semi-spherical mating surface 64 into a resilient member 70. The resilient member frictionally engages the pin 66 and a bore 72 in the center of the adapter 58. The resilient member 70 should have sufficient section between the pin 66 and bore 72 to allow the pin to move toward either side of the bore while compressing the resilient member.

The tool 56 has a planar inner end 73 which engages a planar work face 74 of the anvil member 62. A reciprocating plunger 80 is mounted within a stepped bore 82 located at the longitudinal axis of the tool 56. The plunger 80 is forced to its outermost position by a compression spring 84 which is held in place by a cap 86 pressed into the opposite end of the bore 82. The plunger 80 has a tapered nose 81 that contacts a similar surface in the track pin to locate the tool with respect to the track joint. The tool land 76 is shaped to engage a workpiece or ring 78. In this embodiment the land 76 is circular and located equidistant from centerline 102.

The track chain assembly 88 is fragmently shown at the end of the tool 56. The ring 78 is positioned in a groove 90 formed between the link 44 and pin 48. A thrust ring 92 extends between a counterbore 94 of the link 44 and the end of the bushing 50. A seal 96 located in the counterbore 94 seals the assembly in a manner well known in the art.

INDUSTRIAL APPLICABILITY

The above-described apparatus is used to assemble track chain and more particularly to press the retaining ring 78 into its groove to restrain track pin 48. The link 44 is pressed onto the pin 48 and bushing 50 by advancing the pressure heads 28 and 30 with the ram 20. The ram is then retracted and the chain assembly 88 is relocated to align the track joint 52 with the centrally located anvil 54.

The ring 78 is partially inserted into the groove 90 and the tool 56 is held between the work face 74 of the anvil member 62 and the partially inserted ring 78. The ram 20 is again advanced forcing the tool land 76 against the ring 78. The ring 78 is forced into the groove 90 and is reshaped thereby securing the ring and locking the link 44 and pin 46 together.

As the ram advances the self-aligning anvil 54 and the tool 56, any minor misalignment of the press fixture is compensated for by the semi-spherical mating surface of the anvil. When the tool land 76 contacts the ring 78, the tool 56 forces the anvil member 62 to rotate against the semi-spherical mating surface 64, thereby compensating for misalignment allowing the force from the press to be transmitted to the tool land 76 at a slight angle. In this manner, the workpiece or ring is pressed straight into the groove 90 where it will now bottom uniformly.

Since the semi-spherical surface 64 is formed on a radius extending from the intersection of the centerline of the anvil and the plane through the tool land, the tool and anvil member 62 will rotate without sliding the tool land 76 off the workpiece or ring 78. The resilient means 65 provided by pin 66 and resilient member 70 will return the anvil member 62 to its normal position when the force on the tool 56 is removed.

Other aspects, objects and advantages become apparent from study of the specification, drawings and appended claims.

I claim:

1. A self-aligning anvil for a track press for driving a tool having a tool land to press a workpiece into place, comprising:
    an adapter for mounting the anvil to the track press;
    an anvil member having a work surface for engaging the tool;
    a resilient member mounted in a bore of the adapter at its center;
    a pin secured to the anvil member at its center and extending into the resilient member; and
    wherein the adapter engages the anvil member along a semi-spherical mating surface having a radius extending from an intersection of a centerline of the anvil and a plane extending through the tool land where it engages the workpiece, and wherein the pin extends across the semi-spherical mating surface.

2. A self-aligning anvil assembly for use in a press to drive a work-engaging surface of a tool against a workpiece, comprising:
    an adapter member for mounting to the press at one end and having a concave semi-spherical surface at its opposite end;
    an anvil member having a work-engaging surface for engaging the workpiece and a complementary semi-spherical surface mating with and engaging the concave semi-spherical surface;
    a resilient member mounted in a bore in one of the members at its center;
    a pin secured to the other member at its center and extending across the semi-spherical mating surface and into the resilient member; and
    wherein the semi-spherical mating surfaces each have a radius extending from an intersection of a centerline of the anvil assembly and a plane defined by the work-engaging surface of the tool.

* * * * *